United States Patent
Cotugno et al.

(10) Patent No.: US 9,546,264 B2
(45) Date of Patent: Jan. 17, 2017

(54) TYRE BODY PLY SKIM

(71) Applicant: BRIDGESTONE CORPORATION, Tokyo (JP)

(72) Inventors: Salvatore Cotugno, Rome (IT); Ludovica Caliano, Rome (IT)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/766,476

(22) PCT Filed: Feb. 8, 2014

(86) PCT No.: PCT/IB2014/058870
§ 371 (c)(1),
(2) Date: Aug. 7, 2015

(87) PCT Pub. No.: WO2014/122622
PCT Pub. Date: Aug. 14, 2014

(65) Prior Publication Data
US 2016/0009906 A1 Jan. 14, 2016

(30) Foreign Application Priority Data
Feb. 8, 2013 (IT) .............................. RM2013A0070

(51) Int. Cl.
*C08L 7/00* (2006.01)
*B60C 1/00* (2006.01)
*C08K 3/04* (2006.01)
*C08L 9/06* (2006.01)

(52) U.S. Cl.
CPC . *C08L 7/00* (2013.01); *B60C 1/00* (2013.01); *C08K 3/04* (2013.01); *C08L 9/06* (2013.01)

(58) Field of Classification Search
CPC ................ C08L 7/00; C08L 9/06; B60C 1/00; C08K 3/04
See application file for complete search history.

(56) References Cited

U.S. PATENT DOCUMENTS

| 4,210,475 | A | 7/1980 | Neubert et al. |
| 2007/0123631 | A1* | 5/2007 | Halasa .................. B60C 1/0016 524/493 |
| 2009/0124724 | A1 | 5/2009 | Sakurai et al. |
| 2010/0204368 | A1 | 8/2010 | Benko et al. |
| 2012/0073720 | A1 | 3/2012 | Halasa et al. |
| 2012/0302664 | A1 | 11/2012 | Kamada |
| 2013/0075009 | A1* | 3/2013 | Miyazaki .................. C08L 7/00 152/537 |

FOREIGN PATENT DOCUMENTS

| GB | 929533 A | 6/1963 |
| JP | 2010-242021 A | 10/2010 |
| JP | 2010-242023 A | 10/2010 |

OTHER PUBLICATIONS

International Search Report for PCT/IB2014/058870 dated May 6, 2014 [PCT/ISA/210].
Written Opinion for PCT/IB2014/058870 dated May 6, 2014 [PCT/ISA/237].

* cited by examiner

*Primary Examiner* — John Uselding
(74) *Attorney, Agent, or Firm* — Sughrue Mion, PLLC

(57) ABSTRACT

A compound for a tyre textile body ply skim. The compound has a cross-linkable, unsaturated-chain polymer base, a reinforcing filler composite, and a curing system having at least a curing agent and accelerants. The compound has 0.1 to 20 phr of a lignin derivative, 20 to 50 phr of a first carbon black with a surface area of 90 to 150 $m^2/g$, and 5 to 20 phr of a second carbon black with a surface area of 10 to 40 $m^2/g$.

5 Claims, No Drawings

TYRE BODY PLY SKIM

CROSS REFERENCE TO RELATED APPLICATIONS

This application is a National Stage of International Application No. PCT/IB2014/058870, filed on Feb. 8, 2014, which claims priority from Italian Patent Application No. RM2013A000070, filed on Feb. 8, 2013, the contents of all of which are incorporated herein by reference in their entirety.

TECHNICAL FIELD

The present invention relates to a tyre body ply skim.

In tyre manufacturing, reinforcing plies made of thermoplastic material (e.g. nylon, rayon, polyester, aramide) are used to ensure given resistance standards.

To improve cord-rubber adhesion, the plies are treated with adhesive before the rubber is applied. The resulting reinforced-rubber coat is normally about 1 mm thick. The rubber ply coating is commonly known as a 'body ply skim' and is referred to as such in the following description and accompanying Claims.

BACKGROUND ART

As anyone skilled in the art knows, reinforcing plies are commonly used to reinforce the carcass, and the belts located between the carcass and tread.

The carcass defines the shape of the tyre, supports the load and transmits vehicle stress groundwards, and ensures fatigue resistance of the stressed areas. The belts serve to further increase tyre resistance by stabilizing the tread and safeguarding against shock and damage to the inner layers.

As will be obvious to anyone skilled in the art, the body ply skim must adhere firmly to the plies. In fact, poor adhesion of the body ply skim to the ply invariably results in a short working life of the tyre.

DISCLOSURE OF INVENTION

It is an object of the present invention to provide a body ply skim compound, which provides for firm adhesion to textile plies, while at the same time improving rolling resistance without compromising other characteristics.

The Applicant has devised a textile body ply skim compound designed to improve rubber-textile adhesion, while at the same time also achieving advantages in terms of rolling resistance.

Hereinafter, the term 'high-surface-area reinforcing filler' refers to one with a surface area of 90-150 $m^2/g$, and 'low-surface-area reinforcing filler' to one with a surface area of 10-40 $m^2/g$.

According to the present invention, there is provided a compound comprising a cross-linkable, unsaturated-chain polymer base, a reinforcing filler composite, and a curing system comprising at least a curing agent and accelerants; said compound being characterized by comprising 0.1 to 20 phr of lignin and/or a lignin derivative; and in that said reinforcing filler composite comprises 20 to 50 phr of a first carbon black with a surface area of 90 to 150 $m^2/g$, and 5 to 20 phr of a second carbon black with a surface area of 10 to 40 $m^2/g$.

The surface areas were measured by nitrogen absorption as per ASTM Standard D6556.

Preferably, the body ply skim compound comprises 5 to 15 phr of the lignin derivative.

Preferably, the lignin derivative is sulphonated lignin.

Preferably, said reinforcing filler composite comprises 30 to 40 phr of said first carbon black, and 10 to 15 phr of said second carbon black.

Preferably, said lignin derivative is the only adhesion promoter in the compound.

Another object of the present invention is a tyre comprising a body ply skim; said skim being made from a compound in accordance with the present invention.

BEST MODE FOR CARRYING OUT THE INVENTION

The following are non-limiting examples for a clearer understanding of the invention.

EXAMPLES

Two compounds according to the present invention (Compounds A and B) were produced, and which differ from each other as regards exclusive use of lignin as an adhesion promoter.

Four control compounds (Compounds C-F) were produced. Compound C is a commonly used body ply skim compound containing an adhesion promoter of hexamethoxymethylmelamine. Compounds D and E are compounds containing the lignin derivative, but without conforming to the reinforcing filler content conditions of the present invention. And Compound F contains the reinforcing filler in accordance with the present invention, but no lignin derivative.

Compound Preparation (First Mixing Stage)

The compounds were produced using the standard procedure below, which is not pertinent to the present invention.

A 230-270-liter, tangential-rotor mixer was loaded, prior to mixing, with the cross-linkable polymer base and the reinforcing filler composite to a fill factor of 66-72%.

The mixer was operated at a speed of 40-60 rpm, and the resulting mixture unloaded on reaching a temperature of 140-160° C.

(Second Mixing Stage)

The curing system and zinc oxide were added to the mixture from the first stage to a fill factor of 63-67%.

The mixer was operated at a speed of 20-40 rpm, and the resulting mixture unloaded on reaching a temperature of 100-110° C.

Compound Compositions

Table I shows the compositions in phr of the above six compounds A-F.

TABLE I

|  | A | B | C | D | E | F |
|---|---|---|---|---|---|---|
| NR | 65 | 65 | 65 | 65 | 65 | 65 |
| SBR | 35 | 35 | 35 | 35 | 35 | 35 |
| CB (N660) | 15 | 15 | 25 | 25 | 25 | 15 |
| CB (N326) | 35 | 35 | 35 | 35 | 35 | 35 |
| Lignin sulphate | 10 | 10 | — | 10 | 10 | — |
| HMMM | 0.3 | — | 0.3 | 0.3 | — | 0.3 |
| ZnO | 3 | 3 | 3 | 3 | 3 | 3 |
| Sulphur | 1 | 1 | 1 | 1 | 1 | 1 |
| Accelerant | 1 | 1 | 1 | 1 | 1 | 1 |
| Stearic acid | 1 | 1 | 1 | 1 | 1 | 1 |

NR is a polymer base of natural 1,4-cis polyisoprene, the characteristics of which are well known to anyone skilled in the art;

SBR is a polymer base obtained by polymerization in emulsion or solution, with a 20 to 45% styrene content, and 0 to 30% oil content;

HMMM stands for hexamethoxymethylmelamine, and is a cross-linking agent normally used in body ply skims to improve adhesion to the ply;

N660 and N326 are carbon black classifications as per ASTM Standard D1765;

The term 'accelerant' is used to indicate a generic curing-assist agent.

Laboratory Test Results

The compounds described above were tested to determine adhesion to textile body plies, and rheometric, mechanical and dynamic mechanical properties.

It should be pointed out that the compounds according to the present invention preferably apply to body plies made of thermoplastic material.

More specifically, rheometric properties were measured as per ASTM Standard D6204; mechanical properties were measured as per ASTM Standard D412C; and dynamic mechanical properties were measured as per ISO Standard 4664. As anyone skilled in the art knows, the rolling resistance parameter is closely related to 60° C. tanδ values: the lower the 60° C. tanδ value, the better the rolling resistance.

Adhesion of the compound to the textile ply was assessed as a percentage of the ply still covered with rubber after separating the two parts of the ply-rubber composite under load.

To show more clearly the advantages of the compounds according to the present invention, Table II shows the test results indexed to those of control Compound C representing, as stated, a commonly used body ply skim compound.

TABLE II

|  | A | B | C | D | E | F |
|---|---|---|---|---|---|---|
| ML | 100 | 100 | 100 | 100 | 100 | 90 |
| MH | 92 | 90 | 100 | 100 | 100 | 90 |
| T50 | 100 | 100 | 100 | 100 | 100 | 100 |
| TB | 97 | 90 | 100 | 90 | 97 | 97 |
| M100 | 100 | 100 | 100 | 111 | 113 | 100 |
| M300 | 77 | 77 | 100 | 100 | 100 | 77 |
| EB | 111 | 104 | 100 | 102 | 102 | 110 |
| tanδ at 60° C. | 87 | 87 | 100 | 100 | 100 | 95 |
| Coverage | 129 | 120 | 100 | 100 | 129 | 95 |

As shown by the Table II results, only Compounds A and B according to the present invention provide for improving both adhesion to the thermoplastic ply and rolling resistance. As shown by the Compound D and E results, simply adding lignin, while improving adhesion, produces no improvement in rolling resistance. Whereas Compound F shows how simply reducing the reinforcing filler produces no improvement unless accompanied by the lignin derivative.

Compound B represents a preferred embodiment, and differs from Compound A by containing no HMMM compound, and so only comprising the lignin derivative as an adhesion promoter.

To fully appreciate the advantages of the present invention, it is important to bear in mind that lignin is a widely available natural substance, is cheap by being a waste product of various processes, is harmless to both health and environment, and can be used without a bonding agent to achieve firm rubber-ply adhesion.

The invention claimed is:

1. A compound, comprising: a cross-linkable, unsaturated-chain polymer base, a reinforcing filler composite, and a curing system comprising at least a curing agent and accelerants;
    wherein the compound comprises 0.1 to 20 phr of sulphonated lignin;
    the reinforcing filler composite comprises 20 to 50 phr of a first carbon black with a surface area of 90 to 150 $m^2/g$, and 5 to 20 phr of a second carbon black with a surface area of 10 to 40 $m^2/g$; and
    the sulphonated lignin is the only adhesion promoter in said compound.

2. A compound as claimed in claim 1, wherein the compound comprises 5 to 15 phr of said sulphonated lignin.

3. A compound as claimed in claim 1, wherein the reinforcing filler composite comprises 30 to 40 phr of said first carbon black, and 10 to 15 phr of the second carbon black.

4. A skim for tyre thermoplastic body plies, characterized by being made from a compound as claimed in claim 1.

5. A tyre comprising a body ply skim as claimed in claim 4.

* * * * *